United States Patent [19]
Schroth

[11] Patent Number: 5,934,760
[45] Date of Patent: Aug. 10, 1999

[54] SUPPORT MEANS FOR A SHOULDER BELT OF A SAFETY BELT SYSTEM

[75] Inventor: Carl-Jürgen Schroth, Arnsberg, Germany

[73] Assignee: Carl F. Schroth GmbH, Arnsberg, Germany

[21] Appl. No.: 08/843,733

[22] Filed: Apr. 21, 1997

[51] Int. Cl.⁶ .................................................. B60R 22/00
[52] U.S. Cl. ....................... 297/484; 297/452.18; 297/483
[58] Field of Search ...................................... 297/483, 484, 297/452.18, 468, 474, 475

[56] References Cited

U.S. PATENT DOCUMENTS

| | | | |
|---|---|---|---|
| 5,088,794 | 2/1992 | Iwami et al. | 297/483 |
| 5,464,273 | 11/1995 | Makoto | 297/452.18 X |
| 5,468,053 | 11/1995 | Thompson et al. | 297/452.18 X |
| 5,611,604 | 3/1997 | Thomas et al. | 297/483 X |
| 5,653,504 | 8/1997 | Henson | 297/484 X |
| 5,829,831 | 11/1998 | Sharman | 297/483 X |

*Primary Examiner*—Peter R. Brown
*Attorney, Agent, or Firm*—Friedrich Kueffner

[57] ABSTRACT

A support unit for a shoulder belt of a safety belt system provided with a rolling mechanism in the form of an integrated component of a seat structure of an airplane seat. A sectional traverse girder is mounted approximately on shoulder level between the side walls of the seat structure of an airplane seat. The transverse girder has a guide slot for the shoulder belt and at least two support webs for the rolling mechanism are clamped in a frictionally engaging manner into the transverse girder.

14 Claims, 4 Drawing Sheets

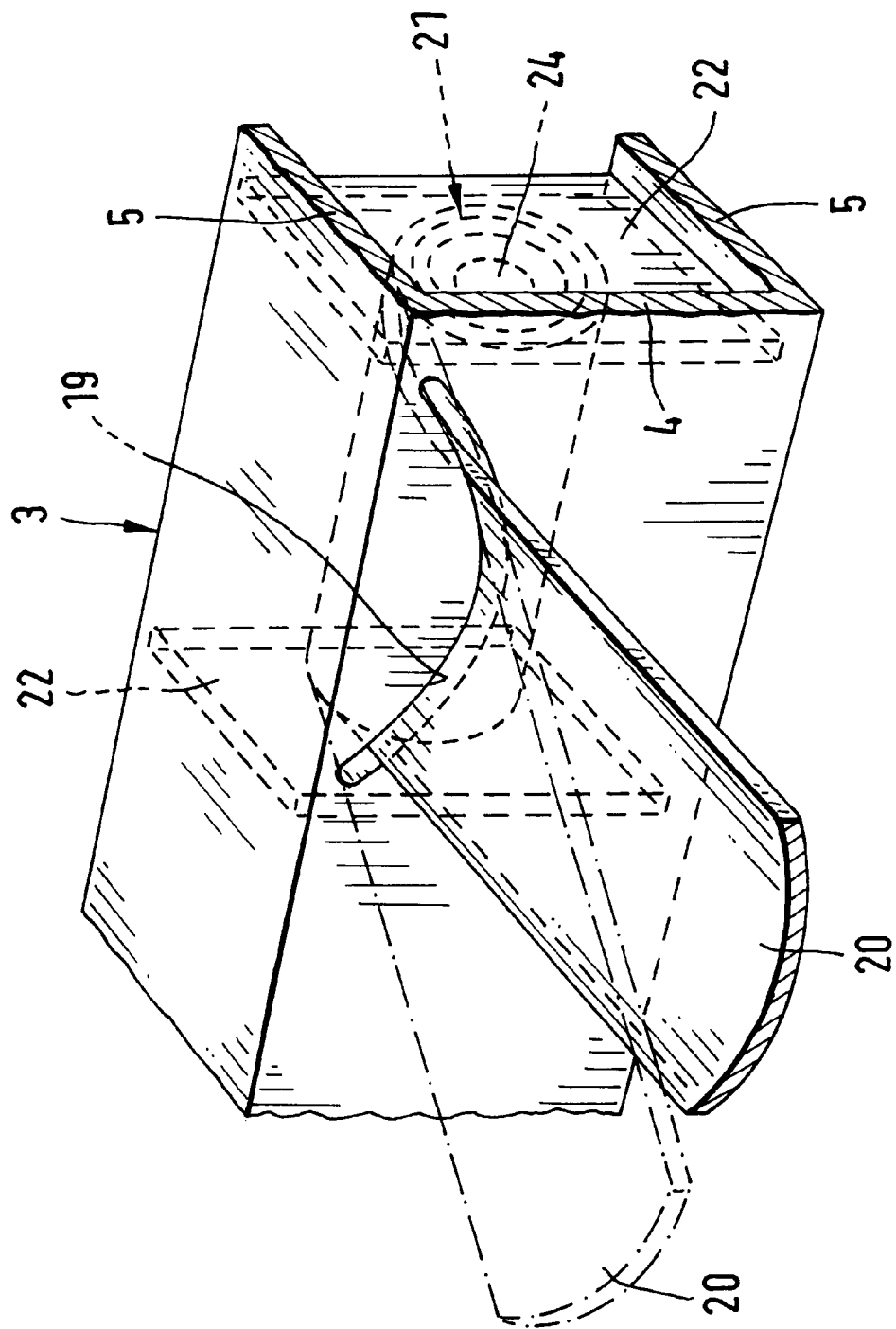

SUPPORT MEANS FOR A SHOULDER BELT OF A SAFETY BELT SYSTEM

BACKGROUND OF THE INVENTION

1. Field of the Invention

The present invention relates to a support means for a shoulder belt of a safety belt system provided with a rolling mechanism in the form of an integrated component of a seat structure of an airplane seat.

2. Description of the Related Art

It is known in the art to subsequently anchor safety belts, particularly the shoulder belts of safety belt systems, to anchoring points intended and specially prepared for this purpose at seat structures of airplane seats, preferably of pilot seats and flight attendant seats. It is necessary for this purpose to provide special reinforcement measures at the seat structures in order to meet the requirements with respect to anchoring to a sufficient extent.

The conditions for permits for the seat structures of airplane seats include dynamic tests in which it is assumed that the seat structures are secured to the floor of a passenger cell and in which it is presupposed that the cell floor is deformed in the case of a crash. Consequently, the seat structures are subjected to significant torsional loads.

In the past, transverse struts in the form of transverse rods or pipes processed in a chip-removing manner were provided in the shoulder areas of the seat structures. These transverse struts were designed to absorb the displacements of the side walls of the seat structures and simultaneously served to deflect the shoulder belts toward the belt anchoring points located approximately on the level of the seats of the seat structures.

However, this known configuration resulted in seat structures having great weights and in very long and heavy seat belts. In the case of the above-described assumed deformation of the floor structure in the case of a crash, the side walls of the airplane seat are displaced relative to each other. Simultaneously, the back rest of an airplane seat is rotated relative to the back of the passenger, represented by a dummy in the approval test, in such a way that only one side of the back rest has contact with the back. A belt constructed in this way is disclosed in DE 36 36 203 A1 which, however, does not have a passage opening in the vertical middle portion which is usually the case in practice for reasons of weight. Because of the resulting longer travel path of one shoulder belt relative to the other shoulder belt in this known belt system, an undesirable loose portion of the belt having the shorter distance occurs. This results in higher belt forces and delays of the dynamic loads, since the initially unsecured shoulder can be held back by the belt only at a later point in time.

However, the forces at the anchoring points of the seat structures to the floors of the passenger cells measured during the dynamic tests are frequently so high that they exceed the strengths of the passenger cell determined by computation. In addition, the delay loads acting on a passenger during an accident must be kept as low as possible in order to prevent injuries to the chest and head. Accordingly, it is attempted in practice to seek to reduce the loads acting at the shoulder belts by using energy converters and force limiting means and, thus, simultaneously to keep the moments occurring at the seat anchoring points as low as possible. If the shoulder belts are deflected as described above, force losses result at the anchoring points of the safety belts of up to 50% relative to those belt forces which are measured between the deflection points and the belt user. If the belt ends are equipped with rolling mechanisms and if energy convertors are additionally to be integrated into the rolling mechanisms, the force levels to be adjusted are so low that the unavoidable manufacturing tolerances may lead to great force differences at the shoulder belts. Consequently, a meaningful reproduceability of the manner of operation of energy convertors/force limiting means for achieving the approval requirements for seat structures of airplane seats is very expensive.

Anchoring systems have the additional disadvantage with respect to costs that, due to the lightweight construction required generally in airplane construction, the housings of the rolling mechanisms are bent out of high-strength aluminum materials. However, such materials require a repeated thermal treatment during the manufacturing process and long processing times.

Finally, another negative aspect of the known constructions is considered to be that tests and maintenance of the belt systems are necessary or required. This is because the belt anchoring systems and rolling mechanisms are integrated into the seat structures because of the narrow space available in such a way that the belt anchoring systems are frequently not accessible without disassembling the entire seat nor are the safety belt systems and the rolling mechanisms capable of disassembly.

SUMMARY OF THE INVENTION

Therefore, starting from the prior art discussed above, it is the object of the present invention to reduce the weight of a seat structure for an airplane seat while increasing the ease of maintenance and simultaneously to integrate the anchoring system for a shoulder belt into the seat structure in such a way that, in addition to lowering the manufacturing costs, it can be ensured that the shoulder belts run tightly over the body of the belt user under all conditions of use in order to achieve an increased protective effect arid to make it possible to better calibrate the force limiting means.

In accordance with the present invention, in order to meet the above-described object, a sectional traverse girder is mounted approximately on shoulder level between the side walls of the seat structure of an airplane seat. The transverse girder has a guide slot for the shoulder belt and at least two support webs for the rolling mechanism are clamped in a frictionally engaging manner into the transverse girder.

Since the transverse girder has a profile, it can not only be constructed in lightweight construction, but it can also absorb relatively high torsional forces without resulting in harmful loads on the seat structure in the event that a crash occurs and the side walls are subjected to a relative displacement toward each other. The transverse girder now serves to secure at least two bearing webs as components of a rolling mechanism for at least one shoulder belt. This means that it is also now no problem, for the purpose of maintenance and repair, to remove the transverse girder to replace the transverse girder by another transverse girder. Consequently, the integration of the rolling mechanisms into the transverse girder also eliminates the need for additional anchoring points at the seat structure, so that the previously necessary reinforcements of the seat structure are no longer necessary and, thus, the weight of the seat structure is reduced. The accessibility of the transverse girder at shoulder level of the seat structure makes it additionally possible to carry out the maintenance and repair to remove the airplane seat from the airplane.

In addition, the arrangement of the transverse girder at shoulder level of the seat structure makes it possible to use the transverse girder for fastening a head rest.

The bearing webs of the rolling mechanism are clamped into the transverse girder in a frictionally engaging manner, i.e., without screw connections. Prior to the assembly with the transverse girder, the rolling mechanism is preassembled with all necessary individual parts, such as, restoring spring, locking mechanism and winding shaft. The capability of clamping the bearing webs without screw connections into the transverse girder provides the additional advantage that, depending on the type of safety belt and the type of rolling mechanism, the bearing webs can be secured to the transverse girder at any length portion thereof. Consequently, the rolling mechanism can be mounted in the middle or on one side, or a pair of rolling mechanisms can be provided for two shoulder belts symmetrically in the transverse girder.

In principle, the transverse girder may be mounted rigidly but removably between the side walls of the seat structure. The connection is effected preferably through threaded bolts or also insertable bolts with securing elements can be used.

However, in accordance with a preferred embodiment, the transverse girder is mounted in an articulated manner to at least a limited extent between the side walls. The limited articulation of the transverse girder relative to the side walls takes into consideration the possible relative displacement of the side walls in the case of a crash and the resulting twisting the transverse girder.

In accordance with a further development of the present invention, the articulated fastening of the transverse girder to the side walls is effected by connecting the ends of the transverse girder in such a way that the ends of the transverse girder are articulated about vertically extending axes. This manner of fastening takes into consideration especially the possible relative displacement of the side walls in longitudinal direction of the airplane.

In this connection, a particularly useful feature of the present invention provides that the ends of the transverse girder are provided with two tongues which are located opposite each other at a distance from each other and engage over brackets fastened to the inner sides of the side walls and that the tongues are connected in an articulated manner to the brackets by means of vertically extending threaded bolts, insertable bolts or pins.

In accordance with another feature, the ends of the transfer girder are connected so as to be movable relative to the side walls about axes extending approximately in longitudinal direction of the transverse girder. This makes it possible to take torsions occurring in the case of a crash even better into consideration. Thus, in this case, the ends of the transverse girder are not only connected to the side walls so as to be movable about vertical axes, but also about horizontal axes. Consequently, a spatially movable connection is effected.

For realizing the spatial articulation, the brackets are connected to the side walls so as to be rotatable. For this purpose, the ends of the transverse girder are connected to the seat structure through brackets which are rotatably coupled to the side walls. This means that the ends of the transverse girder can move relative to the brackets and the brackets can move relative to the side walls. Fastening can be effected by means of threaded bolts.

It is advantageous if the brackets do not carry out a rotary movement relative to the side walls during the normal use of an airplane seat. For this purpose, the present invention provides that the brackets are connected to the side walls in a way which restricts relative movement. This may be effected, for example, by a frictionally engaging fastening of the brackets to the side walls, so that the brackets rotate only after a certain torsional stress is exceeded in the case: of bending of the seat structure.

In accordance with another feature, the position of each bracket relative to the corresponding side wall is secured by a shearing pin. Consequently, the brackets can rotate relative to the side walls only when the shearing pins are destroyed in the case a predetermined torsion stress is exceeded.

In accordance with another feature of the present invention, the transfer girder has a U-shaped cross-section with approximately horizontally extending flanges and a vertical web which faces the seat and is provided with the guide slot for the shoulder belt. This configuration makes it possible to clamp the bearing webs in the transverse girder without problems in a frictionally engaging manner together with the rolling mechanism supported by the bearing webs.

In accordance with another feature, the configuration of the bearing webs is adapted to the internal cross-section of the transverse girder. In addition, the bearing webs are provided on the circumferential narrow sides thereof which come into contact with the vertical web and the flanges of the transverse girder with projecting pins which engage in corresponding recesses provided in the vertical web and the flanges. This makes it possible to secure the bearing webs together with the rolling mechanism in a positive manner in the transverse girder. For the assembly it is merely required to bend the flanges of the transverse girder apart within their elasticity limits to such an extent that the bearing webs can be inserted transversely into the transverse girder and the projecting pins can engage in the corresponding recesses in the vertical web and the flanges of the transverse girder.

In accordance with another embodiment of the present invention, the flanges of the transverse girder are provided with inwardly projecting longitudinal ribs, wherein each flange has a longitudinal rib in the vicinity of the vertical web and another longitudinal rib adjacent the free end of the flange, wherein the end of each flange is constructed as a component of a stiffening ledge having a T-shaped cross-section, and wherein grooves are provided in the longitudinal ribs near the vertical web and in flanges of the stiffening ledges facing each other for receiving the bearing webs whose configurations are adapted to the internal cross-section of the transverse girder. In this case, the grooves in the longitudinal ribs and in the flanges of the stiffening ledges serve to position the bearing webs in longitudinal direction of the transverse girder, while the vertical web of the transverse girder together with the longitudinal ribs extending adjacent the free ends of the flanges of the transverse girder serve to position the bearing webs transversely of the longitudinal direction of the transverse girder.

The T-shaped configuration of the stiffening ledges along the free ends of the flanges of the transverse girder produces a further reduction of the weight of the transverse girder by reducing the wall thickness. In addition, this embodiment has the advantage that it is not necessary to punch out any material and also no holes are visible from the outside which could be an optical distraction.

In accordance with another feature, the guide slot is arc-shaped with a constant radius, wherein the ends of the guide slot are arranged adjacent the side surfaces of the bearing webs which face each other. This arc-shaped configuration of the guide slot for the shoulder belt in the vertical web of the transverse girder makes it possible for the belt user to move to the side without problems; in particular, a pilot can easily reach instruments. The arc-shaped configuration ensures that a movement of the belt user to the side does not cause the belt to be twisted, jammed or even damaged. When the load is removed after an eccentric loading of the shoulder belt, an automatic self-centering of the rolling mechanism in the transverse girder takes place.

In accordance with another particularly advantageous feature of the invention, the guide slot has a length which corresponds approximately to a fourth of a full circle.

Finally, in accordance with another feature, the transverse girder is cut or severed from an extruded aluminum strand.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 7 is a perspective view of the length portion of the transverse girder with a shoulder belt and a rolling mechanism.

DESCRIPTION OF THE PREFERRED EMBODIMENTS

Figure 1:
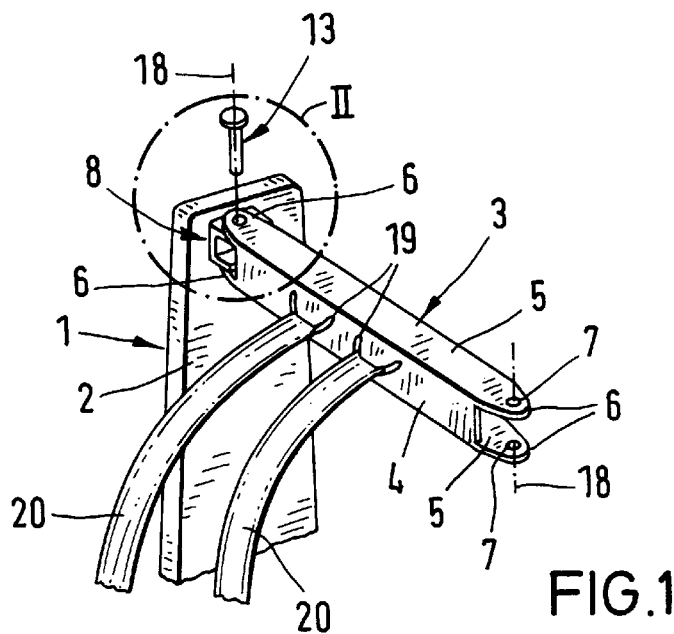
FIG. 1 is a partial schematic perspective view of a seat structure of an airplane seat including a transverse girder with two shoulder belts and the upper part of a side wall of the seat.

In FIG. 1 of the drawing, reference numeral 1 denotes an only partially illustrated seat structure of an airplane seat, not shown in detail. In addition to a sitting area, not shown, the seat structure also includes two side walls 2, wherein the upper portion of one of the side walls is shown in FIG. 1, and a transverse girder 3 which is mounted in an articulated manner to a limited extent between the two side walls 2.

Figure 2:
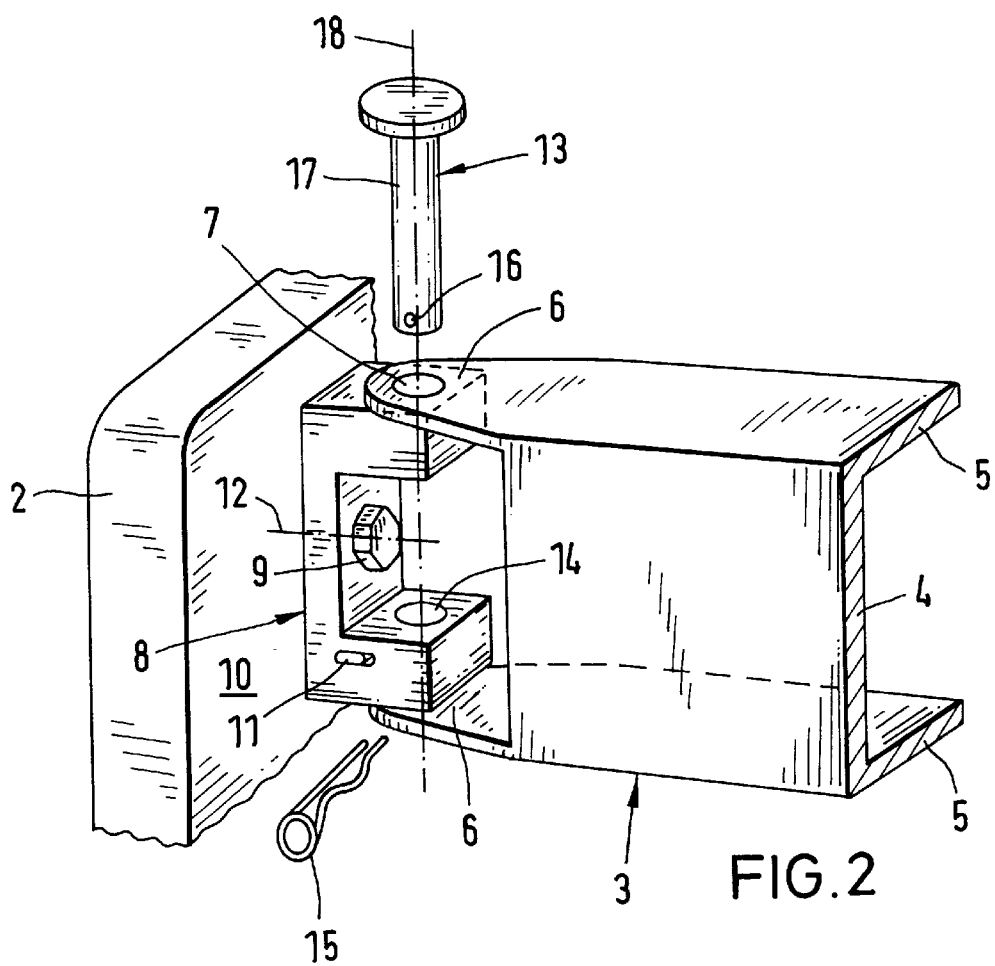
FIG. 2 is a perspective view, on a larger scale, showing detail II of FIG. 1.

As is evident from FIGS. 1 and 2, the transverse girder 3 has a U-shaped cross-section with a vertical web 4 and two horizontally extending flanges 5. The transverse girder 3 is cut from an extruded aluminum strand. Two tongues 6 are provided at each end of the transverse girder 3, wherein the two tongues 6 are arranged spaced apart from each other and one on top of the other. Bores 7 are provided in the tongues 6. The tongues 6 engage over U-shaped brackets 8 which are fastened to the inner sides 10 of the side walls 2 by means of threaded bolts 9. For securing the brackets 8 in position relative to the side walls 2, shearing pins 11 are provided which are supported in the side walls 2 and in the brackets 8. When a certain predetermined torsion stress is exceeded, the shearing pins 11 are destroyed and the brackets 8 can rotate relative to the side walls 2 about axes 12 extending in longitudinal direction of the transverse girder 3.

The tongues 6 are connected to the brackets 8 by means of insertable brackets 13 which can be inserted into the bores 7 in the tongues 6 and in bores 14 of the brackets 8, and by means of safety pins 15 which are inserted into bores 16 in the shafts 17 of the bolts 13. The axes about which the transverse girder 3 can rotate relative to the brackets 8 are denoted by reference numeral 18.

The transverse girder 3 is provided in the vertical web 4 thereof with two arc-shaped guide slots 19 whose ends are directed upwardly. The guide slots 19 have a constant radius. The length of the guide slots 19 corresponds approximately to the third or fourth part of a full circle.

The shoulder belts 20 of a safety belt system, not shown in detail, extend though the guide slots 19, as also seen in FIG. 7. The ends of the shoulder belts 20 are wound onto rolling mechanisms 21 which are completely integrated in the transverse girder, as also shown in FIG. 7. For this purpose, each rolling mechanism 21 has on both end faces thereof a bearing web 22 which together with the rolling mechanism 21 can be clamped into the transverse girder in a frictionally engaging manner, but without screw connections.

The arc-shaped configuration of the guide slots 19 makes it possible that the belt user can move toward the side without causing the shoulder belts 20 to be twisted, jammed or even damaged. When the load acting on the shoulder belts 20 is removed, the shoulder belts 20 automatically slide back into the center position. The two end positions of the shoulder belt 20 are shown in FIG. 7 in solid lines and in dash-dot lines, respectively.

Figure 3:
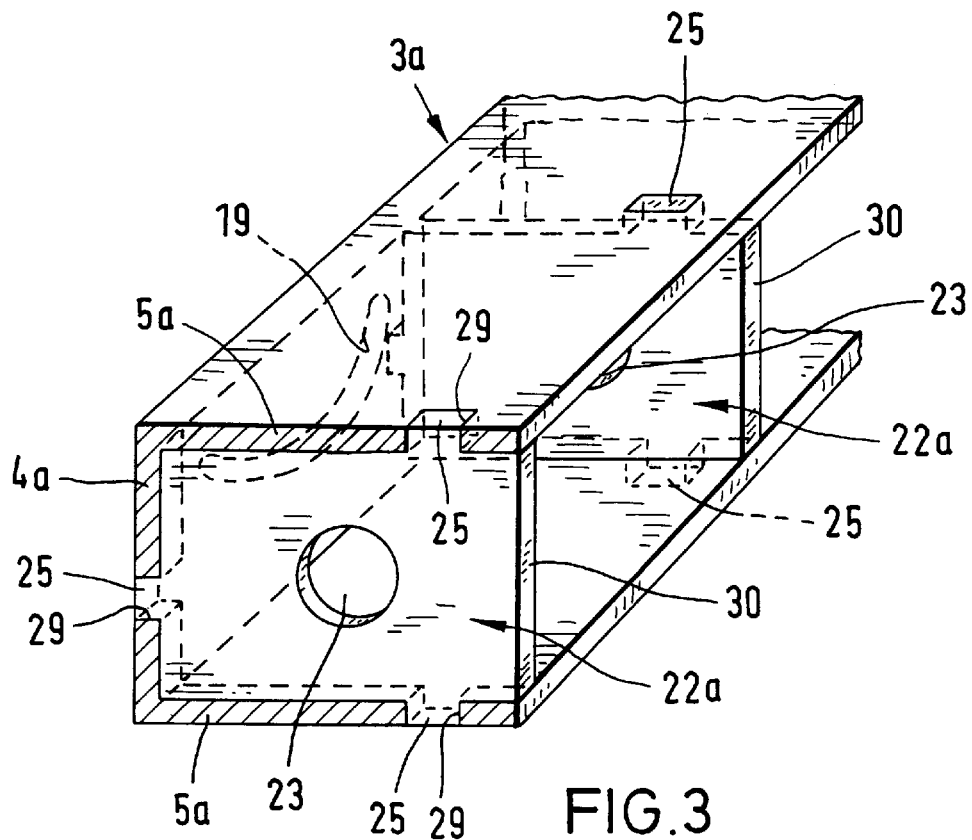
FIG. 3 is a longitudinal perspective view showing the length portion of the transverse girder of FIGS. 1 and 2 with a first embodiment of bearing webs for a rolling mechanism clamped into the transverse girder.
Figure 4:
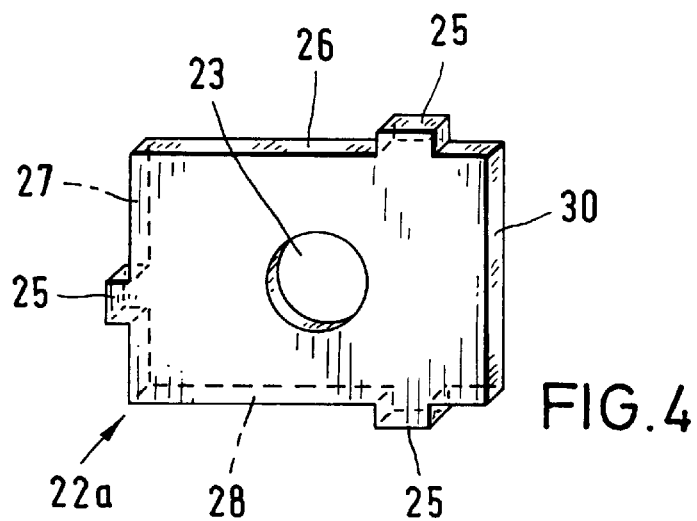
FIG. 4 is a perspective view of a bearing web of the embodiment of FIG. 3.

In accordance with the embodiment in FIGS. 3 and 4, in order to secure the bearing webs 22 in the transverse girder 3 in the operating position, the bearing webs 22a have, in addition to the bores 23 for the winding shaft 24 of the rolling mechanism 21, three additional projections 25 which protrude from the narrow sides 26, 27, 28 and which, in the assembled state shown in FIG. 3, rest against the inner sides of the flanges 5a and the vertical web 4a of the transverse girder 3a. For this purpose, the configuration of the bearing webs 22a is adapted to the internal cross-section of the transverse girder 3a. Recesses 29 are provided in the flanges 5a and in the vertical web 4a and are adapted to the cross-section of the projections 25.

For inserting the bearing webs 22a with the completely preassembled rolling mechanism 21, not shown in FIG. 3, into the transverse girder 3a, it is merely necessary to bend the flanges 5a taking into consideration the natural elasticity thereof and to insert the bearing webs 22a together with the rolling mechanism 21 until the projections 25 engage in the recesses 29 in the vertical web 4a. Once the narrow side 27 comes into contact with the vertical web 4a, the projections 25 at the upper and lower narrow sides 26, 28 of the bearing webs 22a also engage in the recesses 29 in the flanges 5a. The bearing webs 22a and, thus, the rolling mechanism 21 are now positively secured in their position.

The narrow sides 30 of the bearing webs 22a are now located in a plane which intersects the end faces of the flanges 5a.

Figure 5:
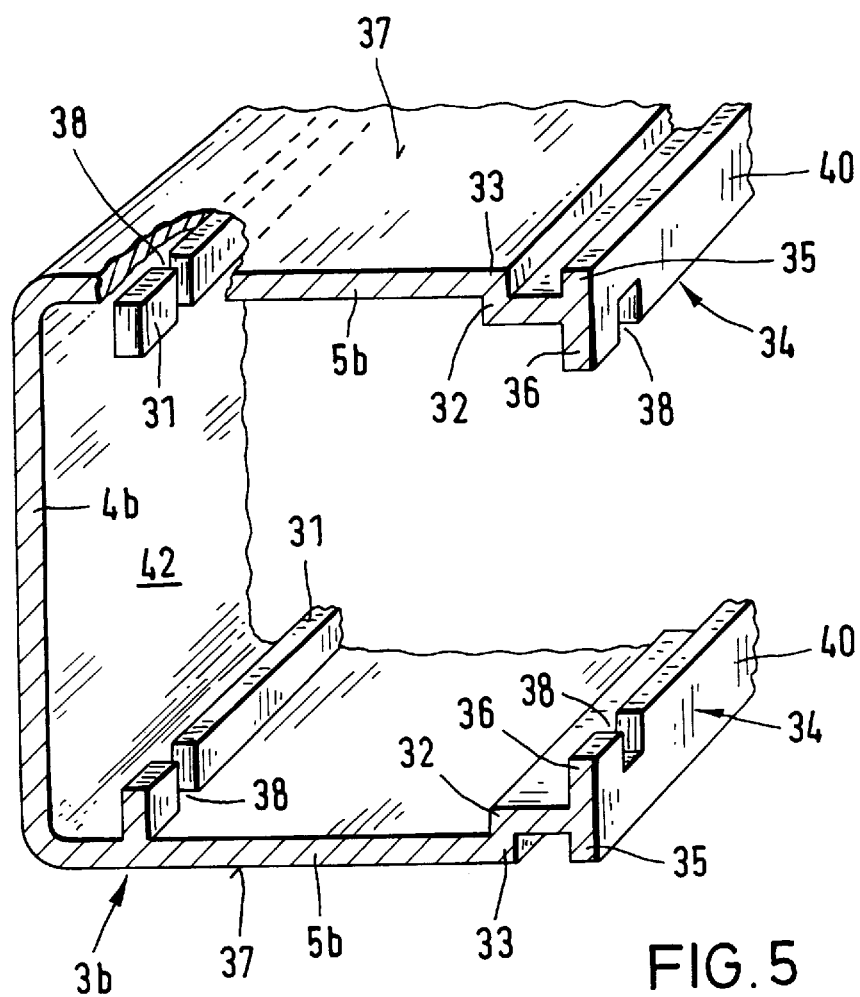
FIG. 5 is a perspective view of the length portion of the transverse girder in accordance with another embodiment.
Figure 6:
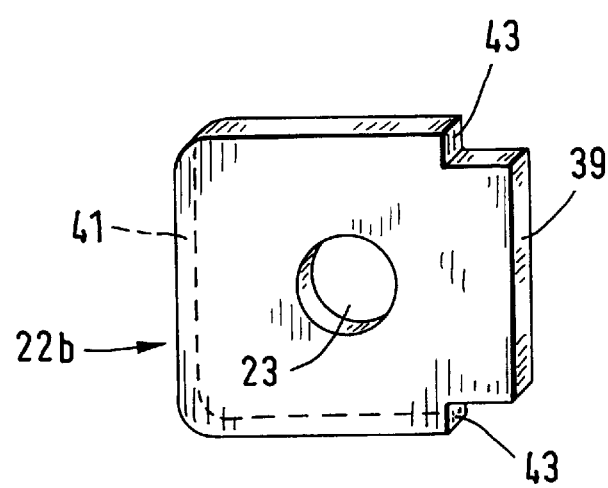
FIG. 6 is a perspective view, on a smaller scale, of the bearing web for the transverse girder of FIG. 5.

In accordance with the embodiment of FIGS. 5 and 6, the flanges 5b of the transverse girder 3b are provided with inwardly projecting longitudinal ribs 31, 32. Each flange 5b has a longitudinal rib 31 extending near the vertical web 4b, while the other longitudinal rib 32 extends adjacent the free end 33 of the flange 5b. The longitudinal ribs 32 arranged at the ends 33 of the flanges 5b simultaneously serve to support stiffening ledges 34 having a T-shaped cross-section. The flanges 35 of the stiffening ledges 34 do not protrude beyond the planes which extend through the outer surfaces 37 of the flanges 5b.

The inwardly directed flanges 36 of the stiffening ledges 24, as well as the longitudinal ribs 31 extending near the vertical web 4b are provided with grooves 38 for receiving bearing webs 22b shown in detail in FIG. 6. The bearing webs 22b are provided with bores 23 for receiving the winding shaft 24 of the rolling mechanism 21. The width of the grooves 38 corresponds to the thickness of the bearing webs 22b. The configuration of the bearing webs 22b is adapted to the internal cross-section of the transverse girder 3b in the area of the grooves 38, as shown in FIG. 5. In the assembled state, the narrow sides 39 of the bearing webs 22b are located in a plane which also extends through the end faces 40 of the stiffening ledges 34.

For inserting the bearing webs 22b with the preassembled rolling mechanism 21, the bearing webs 22b are pushed transversely into the transverse girder 3b through the grooves 38 into the flanges 38 of the stiffening ledges 34, so that the flanges 5b of the transverse girder 3b are moved apart taking into consideration the natural elasticity thereof. Once the narrow sides 41 of the bearing webs 22b have contacted the inner surface 42 of the vertical web 4b, the projections 43 of the bearing webs 22b engage behind the longitudinal ribs 32 at the free ends 33 of the flanges 4b. The bearing webs 22 are now secured in position together with the rolling mechanism 21.

While specific embodiments of the invention have been shown and described in detail to illustrate the inventive principles, it will be understood that the invention may be embodied otherwise without departing from such principles.

I claim:

1. A seat structure of an airplane seat comprising a safety belt system including a shoulder belt and a rolling mechanism as an integrated component of the seat structure of the airplane seat and a support means for the shoulder belt, the seat structure comprising side walls of the seat, the side walls having upper ends, the support means comprising a sectional transverse girder mounted at the upper ends between the side walls of the seat structure, the transverse girder having wall members with surfaces which face each other and a guide slot for the shoulder belt, further comprising at least two bearing webs for supporting the rolling mechanism, the bearing webs being configured to be clamped in a frictionally engaging manner between the surfaces of the wall members of the transverse girder.

2. The seat structure according to claim 1, wherein the transverse girder has ends with tongues, wherein a bracket is attached to each side wall, and wherein each bracket and the tongues have bores in alignment with each other, further comprising a bolt extending through the bores of the bracket and the tongues, such that the ends of the transverse girder are connected to the side walls in an articulated manner at least to a limited extent.

3. The seat structure according to claim 2, wherein each bolt extends essentially vertically.

4. The seat structure according to claim 2, wherein each end of the transverse girder has two tongues located spaced apart at a distance from each other, the side walls having inner sides, and a bracket fastened to the inner side of each side wall, wherein the tongues engage over the bracket at each side wall, and wherein the tongues are connected in an articulated manner to the brackets by means of bolts or pins.

5. The seat structure according to claim 2, wherein the brackets are connected to the side walls by threaded bolts, such that the brackets are movable about axes extending essentially in longitudinal direction of the transverse girder.

6. The seat structure according to claim 5, wherein the brackets are connected to the side walls so as to be rotatable about the threaded bolts relative to the side walls.

7. The seat structure according to claim 6, wherein the brackets are screwed to the side walls so as to effect a frictional engagement between the brackets and the side walls, whereby movement of the brackets relative to the side walls is restricted.

8. The seat structure according to claim 7, comprising shearing pins for securing the brackets in position relative to the side walls.

9. The seat structure means according to claim 1, wherein the transverse girder has a U-shaped cross-section with a vertical web and two essentially horizontally extending flanges connected to the vertical web, wherein the vertical web faces the seat and is provided with the guide slot for the shoulder belt.

10. The seat structure means according to claim 9, wherein the transverse girder has an internal cross-section and each bearing web has a configuration corresponding to the internal cross-section of the transverse girder, each bearing web having circumferential narrow sides resting against the vertical web and the two flanges of the transverse girder, the narrow sides having projections, the vertical web and the flanges having recesses for receiving the projections of the bearing web.

11. The seat structure means according to claim 9, wherein the transverse girder has an internal cross-section and each bearing web has a configuration corresponding to the internal cross-section of the transverse girder, wherein the flanges of the transverse girder have inwardly projecting longitudinal ribs, wherein one longitudinal rib of each flange is located adjacent the vertical web and another longitudinal web of each flange extends along a free end of the flange, the flange having mounted thereon a stiffening ledge having a T-shaped cross-section, each stiffening ledge having an inwardly directed flange, grooves being provided in the longitudinal ribs adjacent the vertical web and in the flanges of the stiffening ledges for receiving the bearing webs.

12. The seat structure means according to claim 1, wherein the guide slot is arc-shaped with a constant radius, the guide slot having ends located adjacent side surfaces of the bearing webs facing each other.

13. The seat structure means according to claim 12, wherein the guide slot has a length corresponding approximately to a fourth of a full circle.

14. The seat structure means according to claim 1, wherein the transverse girder is a section of an extruded aluminum strand.

* * * * *